United States Patent [19]

Hohrman

[11] Patent Number: 4,883,285
[45] Date of Patent: Nov. 28, 1989

[54] REMOVABLE TRAILER HITCH

[76] Inventor: Harlan W. Hohrman, HCR 32, Box 74, Fort Pierre, S. Dak. 57532

[21] Appl. No.: 289,814

[22] Filed: Dec. 27, 1988

[51] Int. Cl.$^4$ ............................................. B60D 1/06
[52] U.S. Cl. ............................ 280/491.5; 280/423.1; 280/901; 403/330
[58] Field of Search ................ 280/491.1, 491.5, 901, 280/498, 507, 508, 509, 510, 511, 423.1, 433, 495, 496; 403/330, 384

[56] References Cited

U.S. PATENT DOCUMENTS

| | | | |
|---|---|---|---|
| 3,820,821 | 6/1974 | Leland | 280/433 |
| 4,047,734 | 9/1977 | Miles | 280/491.5 |
| 4,632,595 | 12/1986 | Schaeff | 403/330 |

Primary Examiner—Charles A. Marmor
Assistant Examiner—A. M. Boehler
Attorney, Agent, or Firm—Clayton R. Johnson

[57] ABSTRACT

A trailer hitch that provides a heavy duty center box type for gooseneck or fifth-wheel trailers which may be quickly removed from a truck bed to leave the truck bed uncluttered and unobstructed. The hitch includes a hitch frame that fixedly mounts rear latch legs to depend therefrom through slots in the bed to latchingly engage the rear edge portion of a mounting member which is fixed to the truck frame beneath the truck bed (floor). A pair of front latch legs are pivoted to the hitch frame in depending relationship for movement by a handle between a position to latchingly engage the front edge portion of the mounting member and a release position. Lock arms are mounted on the hitch frame for pivotal movement by trigger mechanism between a position to retain the front latch legs in their latching position and a position permitting the front latch legs to move to their release position. The trigger mechanism is resiliently retained in a position that the lock arms hold the front latches in their latching position. A hitch ball extends above the hitch frame.

15 Claims, 2 Drawing Sheets

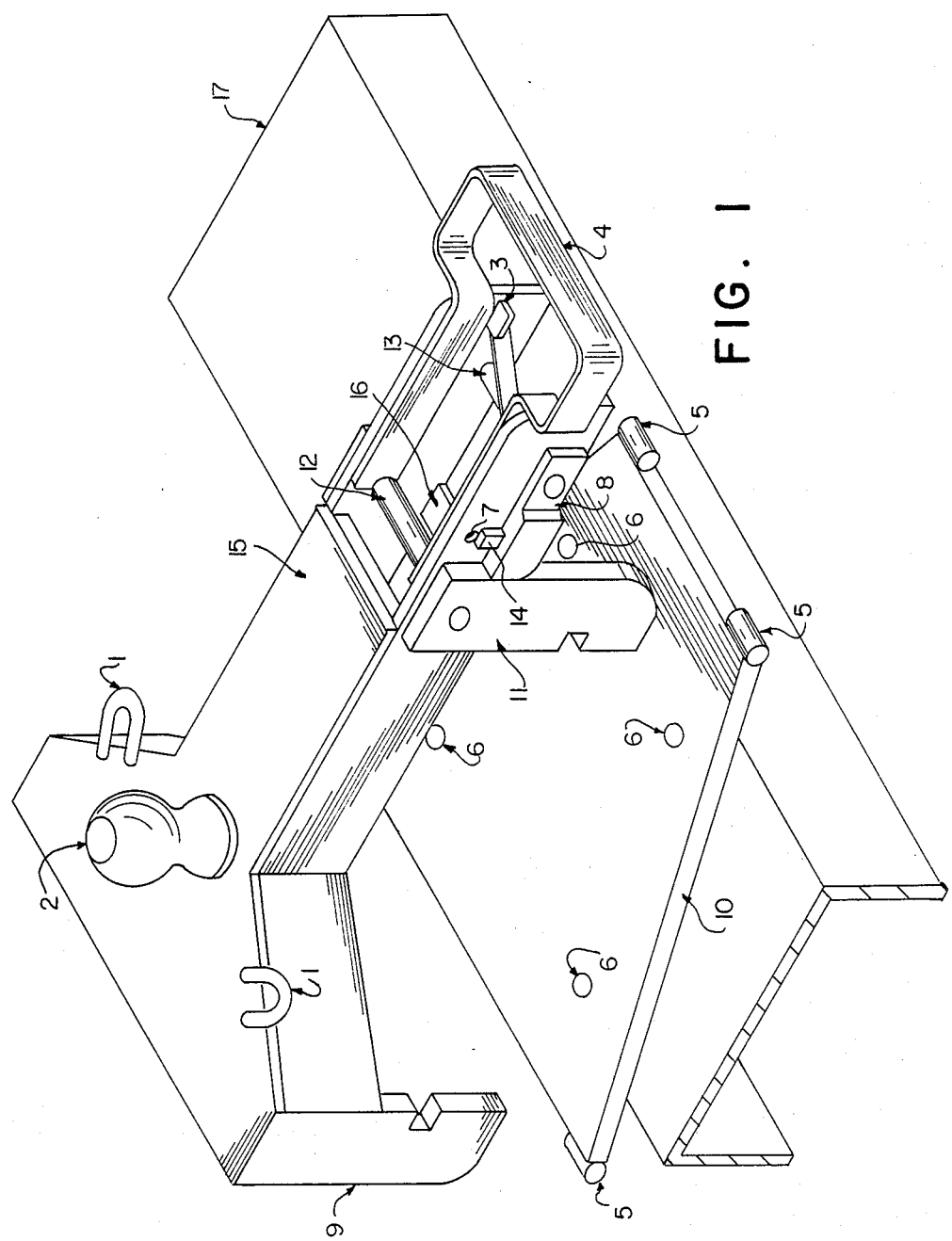

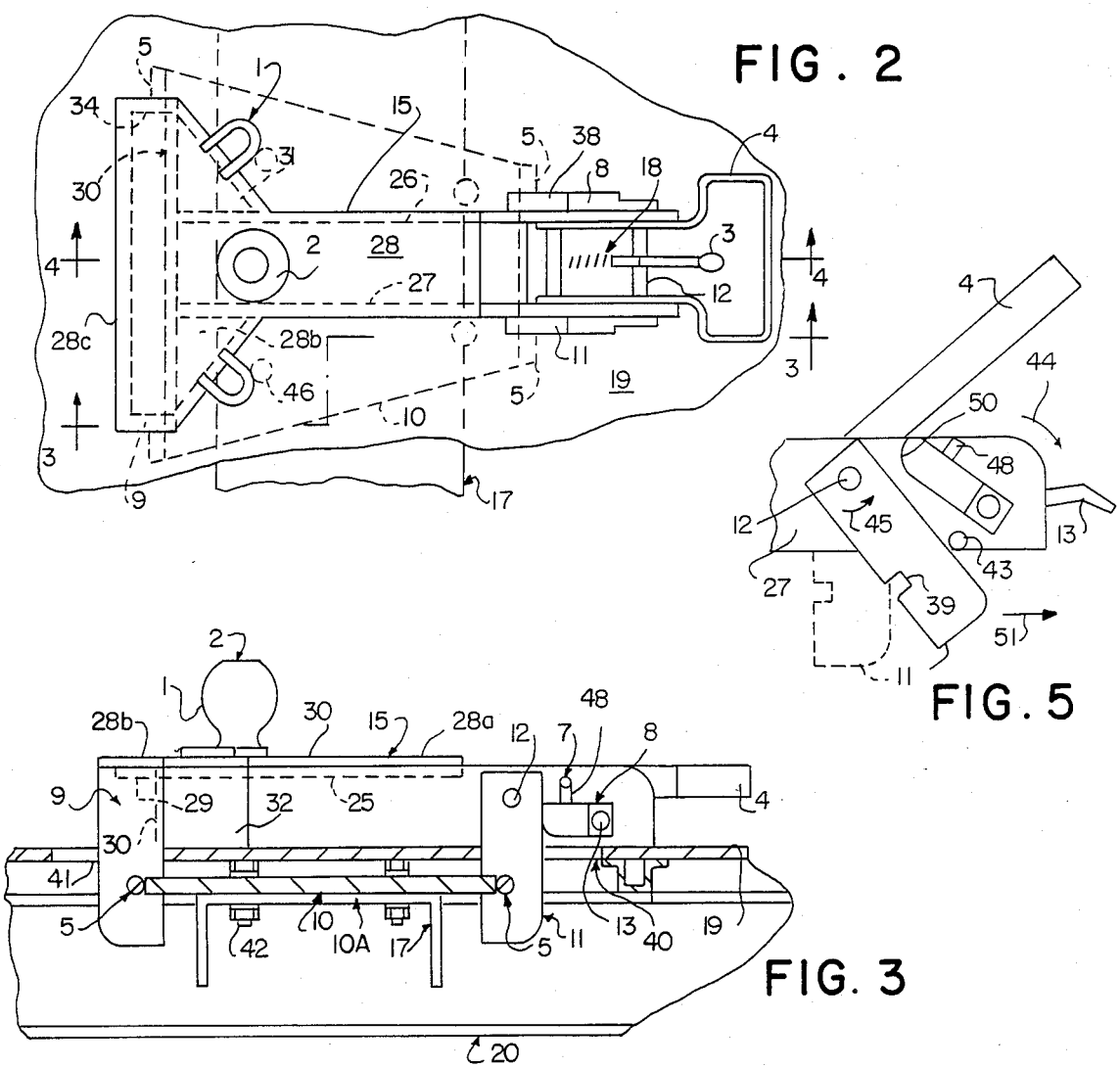
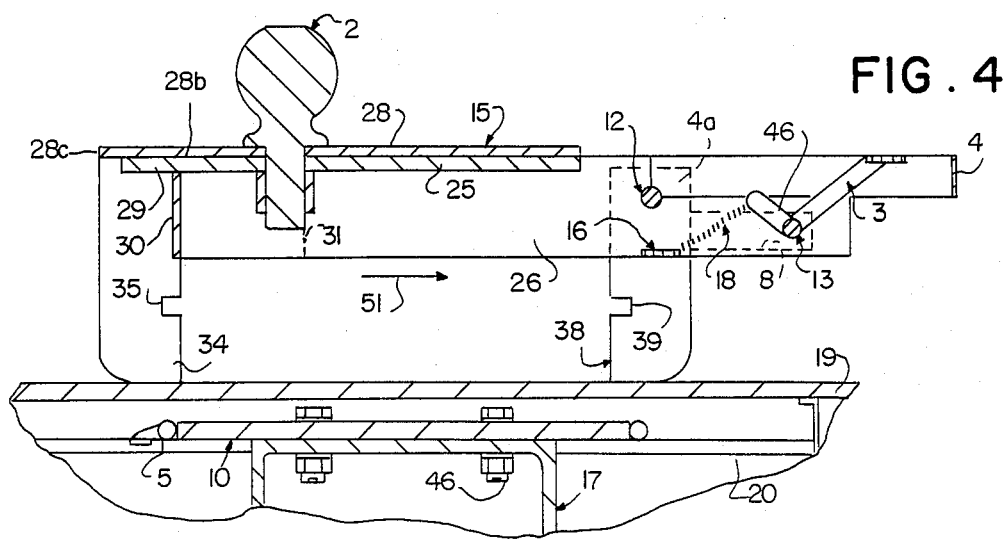

REMOVABLE TRAILER HITCH

BACKGROUND OF THE INVENTION

U.S. Pat. Nos. 4,643,443 to Husa and 4,088,339 to Sagebiel each disclose a hitch assembly mounted by a pickup truck bed that may be removed without using tools and leaving any part extending above the truck floor. Husa relies on rather cumbersome diverging front and rear channel apparatus that abut against the box side walls to hold the hitch pin in place while Sagebiel discloses bracket mechanism abutting against the truck box wheel wells and lever retracted pin mechanism extendable through the wheel well walls for releasably retaining the brackets in place. Taylor 4,546,994 discloses-trailer hitch apparatus that includes a main support frame mounted on the truck frame beneath the truck bed to which a reinforcing bed plate is bolted with the bed plate being above the floor to removably mount a trailer hitch. Leland 3,820,821 discloses bolting a mounting frame to the truck box floor that removably, slidably mounts fifth wheel kingpin lock and bearing apparatus. Other patents that disclose a removable ball hitch include 4,540,194 to Dane, and 4,657,274 to Marin et al.

In order to provide an improved removable trailer hitch apparatus, this invention has been made.

SUMMARY OF THE INVENTION

The present invention is a trailer hitch having a hitch frame that mounts longidinally spaced front and rear latch arms to extend therebeneath and are extendable through slots in the truck bed to latchingly engage the front and rear edge portions respectively of a mounting member. The mounting member is bolted to the truck frame beneath the slots. A handle is fixed to a front pivot rod that in turn mounts the front latch legs to the hitch frame for movement between a release position and a latched position to latchingly engage the mounting member. Lock arms are pivotally mounted by the hitch frame and are pivotally moved by a spring loaded trigger between a lock position for retaining the front latch legs in their latch leg latched position and an unlocked position.

One of the objects of this invention is to provide new and novel means for removably mounting a ball hitch on a truck floor. A further object is to provide in a removable hitch, new and novel means for releasably retaining the hitch frame in a desired position on the truck floor. Another object of this invention is to provide hitch apparatus that is removably positionable on a truck bed having new and noval latch means that is adapted to be locked by a padlock to prevent movement away from the truck bed.

BRIEF DISCRIPTION OF THE INVENTION

FIG. 1 is an exploded view showing a fragmentary part of the truck bed, the mounting member and the trailer hitch of this invention with the front latch legs, the lock arms, the trigger mechanism and the handle in their datum positions;

FIG. 2 is a plan view of the structure of FIG. 1 together with a fragmentary part of the central portion the truck floor;

FIG. 3 is a fragmentary longitudinal cross sectional view through the truck bed and frame that is generally taken along the line and in the direction of the arrows 3—3 of FIG. 2 and a side view of the hitch apparatus showing the latch apparatus in a latched, locked position;

FIG. 4 is a longitudinal cross sectional view generally taken along the line and in the direction of the arrows 4—4 of FIG. 2, other than the trailer hitch is shown at a higher elevation than the truck bed; and FIG. 5 is a fragmentary view of the trailer hitch showing the front latch legs and the lock arms respectively in their release and unlocked positions.

Referring to the drawings the trailer hitch has a hitch frame 15 that includes a generally U-shaped upside down elongated channel with the front web portion 25 and opposite longitudinally elongated, transversely spaced, vertical legs 26, 27. The legs extend a substantial distance forwardly of the web portion. Welded or otherwise fixed to the web portion is a top plate 28 having a generally rectangular rear portion 28a and a generally hexagonal portion 28b that has a front edge integrally joined to portion 28a and an opposite rear edge 28c parallel thereto. A transversely elongated horizontal reinforcing plate 29 is joined to the rear part of portion 28b and to portion 25 to extend reawardly thereof while a vertical transverse plate 30 is welded to the front edge of plate 29 and legs 26, 27. Gussets 31, 32 are joined to opposite transverse edges of plate 30 and plate portion 28b to converge forwardly and have their front edges joined to the adjacent part of legs 26, 27 respectively. The bottom edges of the channel legs, plate 30 and gussets 31, 32 are substantially coplanar. Other reinforcing parts (not shown) may be provided.

Joined (welded) to opposite transverse edges of the plate 29, the rear part of portion 28b and plate 30 are rear latch legs 9, 34 respectively. The lowermost parts of the rear latch legs are more remotely downwardly spaced from the top plate (wall) 28 than the bottom edges of the channel legs. Latch legs 9, 34 have forwardly opening rectangular notches 35 located more remote from plate 28 than the hitch frame bottom edges.

A transverse pivot pin 12 is pivotally mounted by the front intermediate portions of channel legs 26, 27. The pivot pin 12 has the radially inner end portions of the front latch legs 11, 38 fixed thereto to rotate therewith between their latching position (FIGS. 1-4) and their release position (FIG. 5). The front legs in their latching position have rearwardly opening rectangular notches 39 at the same elevations as the slots 35. A handle 4 has the radial inner ends of its legs fixed to the pivot pin 12 for moving the front latch legs relative to the hitch frame between their position, the handle web portion being located forwardly of the front ends of the channel legs. The rear legs and the front legs in their latching position are elongated in a vertical direction. Further the transverse spacing of the rear latch legs is substantially greater than the corresponding spacing of the front legs and are equally transversely spaced from the adjacent channel leg to extend longitudinally rearwardly thereof. The front legs are on opposite sides of the channel legs and closely adjacent thereto. Additionally, advantageously the longitudinal spacing of the front latch legs from the rear latch legs is substantially greater than the transverse spacing of one rear leg from the other.

The truck floor 19 of the towing vehicle, for example the box floor of a pick-up truck, is provided with front and rear latch leg slots 40, 41 respectively to have the front and rear legs respectively extend downwardly therethrough. The floor is mounted on the truck frame 20. The truck frame includes a transverse channel member 17 located longitudinally between and vertically below the front and rear slots.

Bolts 42 are extended through apertures 6 in the mounting plate 10 to secure the plate to the transverse mid-portion of the channel member to be located vertically between the truck floor and the channel member. Advantageously the mounting plate may be of an isosceles trapezoidal shape with its minor base located forwardly. The mounting plate forms a part of a mounting member that also includes transverse studs 5. A stud 5 is welded to each corner portion of the mounting plate to extend transversely outwardly thereof to have one stud located vertically below each of the slots 40, 41. As will be more fully set forth below, the studs extend into the latch leg notches when the trailer hitch is latched in its position of use.

In order to releasably retain the front latch legs in latching engagement with the mounting member, there is provided lock mechanism that includes a transvers rod 13 pivotally mounted by the channel legs 26, 27 forwardly of and at a lower elevation than pin 12. Lock arms 8 have their radial inner ends fixed to the opposite ends of the rod 13 in positions to have their radial outward end portions abuttable against the front latch legs verticay between the sots 39 and pin 12 for retaining the front latch legs in latching engagement with the mounting member. A stop pin 43 is mounted by channel leg 27 to limit movement of the lock arms in the direction of arrow 44 to their datum, latch leg locking position of FIGS. 1 and 4.

For moving the lock arms from their datum position, the lock mechanism includes trigger mechanism having a lever member 3 that has its radial inner end fixed to rod 13 transversely between the channel legs and its radial outer end located forwardly of the rod 13. A crank arm 46 has one end fixed to rod 13 and its opposite end located above and rearwardly of rod 13. A coil spring 18 has one end attached to said opposite end of the crank arm. The opposite end of the spring is attached to a transverse brace 16 that extend between the channel legs and joined thereto below and rearwardly of the rod 13. The spring constantly resiliently urges the crank arm and thereby the lock arms to pivot in the direction opposite arrow 44 about the pivot axis of rod 13 to their datum locked position. Rod 13 also serves to limit the pivotal movement of the handle in the direction opposite arrow 45.

To permit padlocking the lock arms in their locked position, a channel leg is provided with an aperture 7 to have the padlock shackle extend through in abutting engagement with block 48 that is fixed to the upper mid-portion of the adjacent lock arm while the lock arm abuts against stop 43.

A hitch ball 2 is secured to the hitch frame to extend above the top plate at a location longitudinally between the front and rear latch legs, rearwardly of the handle pivot and transversely centered relative to the channel legs. Preferrably the ball hitch is removably mounted on the top plate so that it may be replaced. Loos 1 are welded to the trailer frame for having safety chains secured thereto.

With the latch legs and lock arms in their datum positions shown in FIGS. 1-4, the trailer hitch moved above the slots 40, 41, the trigger mechanism 3, 13, 46 is pivoted in the direction of arrow 44 to move the lock arms out of engagement with the latch legs to their unlocked position. While the lock arms are in their unlocked position, the handle 4 is pivoted in the direction of arrow 45 to move the front legs to their release position wherein the front legs are inclined downwardly in a forward direction (arrow 51). With the front legs in their release position, the lever 3 no longer has to be maintained in its depressed position of FIG. 5 since spring 18 moves the lock arms into abutting relationship with the latch legs. At this time the front legs prevent the lock arms moving to their datum position.

With the front latch legs in their release position, the latch legs are moved downwardly into the slots 40, 41 until the hitch frame bottoms against the top surface of the truck floor. At this time with the entire rear latch leg notches 35 located rearwardly of the rear studs 5, the handle is pivoted in the direction opposite arrow 45, or if the spring is sufficiently strong, it will result in the lock arms forcing the front latch legs pivoting to their latched position. In either event the front legs are pivoted sufficiently rearwardly the front studs are located, in the front notches 39. Either as the result of moving the trailer hitch forwardly by manually grasping the hitch frame (manually moving the handle forwardly), or pivoting the handle in the direction opposite arrow 45 and the front latch legs abutting against the front studs (front transverse edge of the mounting member), the rear latch legs are moved so that the rear studs are located within the rear notches 35. When the forward movement or the rear latch legs is stopped by the rear studs abutting against the rear edges of the notches 35 and the front latch legs have pivoted to their downwardly vertical position, the front studs abut against the front edges of the front notches, further movement of the front legs in the direction opposite arrow 45 is blocked.

At the time the latch legs have moved to have the vertical edges of the notches abut against (or very closely adjacent to) the studs, the lock arms are free to, and are resiliently moved to the lock arms datum position. It is noted that the lock arms have arcuately curved surfaces 50 abuttable against the front latch leg edges as the front latch legs move from their release position to their latching position. With the latch legs in their datum position, the studs abutting against the vertical edges of the notches, the lock arms in their locked positions abutting against the (or very closely adjacent to) front latch legs, block any significant pivotal movement of the front latch legs and the latch legs block any significant fore and aft movement of the hitch frame relative to the truck bed. Further since the bottom horizontal edges of the notches underlay the studs the hitch can not be moved any significant distance upwardly of the truck floor. Advantageously the notches are of horizontal dimensions to have horizontal edges in part on vertical opposite sides of the vertically adjacent parts of the respective front and rear portions of the mounting plate. The front edges of the rear slots 41 are longitudinally spaced from the rear edges of the front slots by about the same longitudinal spacing as the front edges of the rear latch legs from the rear edges of the front legs.

When it is desired to remove the trailer hitch from the truck bed, first the lever 3 is pivoted in the direction of arrow 44 and then the handle 4 is pivoted in the direction of arrow 45 to move the front legs to their release position. While the front legs are retained in their release position, a rearward force is applied to the trailer hitch to translate the hitch rearwardly so that the rear latch legs are completely longitudinally rearwardly of the rear studs. Now while the handle is retained in the front legs latch released position, the trailer hitch is manually moved vertically upwardly to be removed from the truck bed. Thus no tools are required for attaching or removing the trailer hitch from the truck bed.

Even though the mounting member has been described as having studs that have rounded surfaces to facilitate the movement of the latch legs relative to the mounting plate to their latching position, the mounting member may be just a plate that has bottom surface 10A and opposite transverse edge portions abuttable against the vertical edges of the notches. Further even though the hitch frame has been described as being made up of a number of separate pieces to facilitate the description thereof it is to be understood it could be made as a single unitary piece or more or less pieces welded together to form a frame that functions as described. Additionally the plan view of the hitch frame may be varied as long as it functions to mount the various other parts to function as described. The truck bed slots are of lengths to permit movement of the latch legs relative to the bed as referred to above.

Although the rod 12 is pivotally mounted, it is to be understood that the rod may be fixedly mounted by the hitch frame and the legs 4a at their radial inner ends fixed to the radial inner ends of the front latch legs and transversely outwardly of the hitch frame legs.

The trailer hitch of the invention which has been described herein may be quickly removed and replaced without the use of tools.

What is claimed is:

1. A trailer hitch adapted to be removably mounted on the bed of a towing vehicle that has a mounting member mounted to the vehicle frame beneath the bed with the mounting member front and rear transverse end portions beneath longitudinally spaced front and rear latch members slots that extend vertically through the bed, comprising a hitch frame having a front end, an intermediate and a rear end portion, a rear latch member fixed to the hitch frame rear end portion to extend a substantial distance below the hitch frame, the rear latch member being adapted to extend downwardly through the rear slot and having a forwardly opening notch for receiving the mounting member rear end portion therein, a front latch member adapted to extend downwardly through the front slot and being movable in the front slot between a release position and a latching position to latchingly engage the mounting member front end portion, the front latch member having a rearwardly opening notch for receiving the mounting member therein when the front member is in its latching position and being spaced from the mounting member when the front latch member is in its release position, and first means for movably mounting the front latch member on the hitch frame adjacent to the hitch frame front end portion and selectively moving the front latch member between its positions.

2. The trailer hitch of claim 1 further characterized in that the first means includes a transverse pivot member having a transverse pivot axis pivotally mounted by the hitch frame and a handle joined to at least one of the pivot member and the front member for pivoting the front member between the front member positions.

3. The apparatus of claim 2 further characterized in that a ball hitch is mounted on the hitch frame longitudinally between the front and rear latch members.

4. The apparatus of claim 1 further characterized in that it includes second means movably mounted on the hitch frame for movement relative to the hitch frame between a position for locking the front latch member in its latching position and an unlocked position permitting the front latch member being moved to the front latch member release position.

5. The apparatus of claim 4 further characterized in that the second means includes a lock arm, and third means for mounting the lock arm on the hitch frame and moving the lock arm between a datum first position abutting against the front latch member in the front latch member latching position and a second position permitting the front latch member being moved to the front latch member release position.

6. The apparatus of claim 5 further characterized in that the third means includes means for constantly resiliently urging the lock arm to move to the lock arm first position.

7. The apparatus of claim 5 further characterized in that the third means includes a pivot member pivotally mounting the lock arm on the hitch frame and means for constantly resiliently urging the pivot member to move the lock arm to its first position.

8. The apparatus of claim 7 further characterized in that the third means is mounted on the hitch frame for limiting the movement of the lock arm in a direction from the lock arm second position toward the lock arm first position to the lock arm first position and that at least one of the hitch frame and the lock arm has means adapted for being padlocked to prevent movement of the lock arm from the lock arm first position.

9. The apparatus of claim 1 wherein the bed has second latch member front and rear slots transversely spaced from the bed first front and rear slots and extending through the bed to open to the mounting member front and rear edge portions respectively, further characterized in that a second rear latch member is fixed to the hitch frame rear end portion to extend a substantial distance below the hitch frame, the rear latch member being adapted to extend downwardly through the second rear slot for receiving the mounting member rear end portion therein, a second front latch member adapted to extend downwardly through the second front slot and being movable in the second front slot between a release position and a latching position to latchingly engage the mounting member front end portion, the second front latch member having a rearwardly opening notch for receiving the mounting member front end portion therein when the front member is in its latching position and being spaced from the mounting member when the front latch members are in their release position, the first means being fixed to the second front latch member for mounting the second latch member and moving the second latch member simultaneously with the first front latch member, and that there is provided second means for releasably retaining at least one of the front latch member and the first means to block movement of the front latch members from their latching position.

10. The apparatus of claim 9 further characterized in that the first means includes fourth means for pivotally mounting the front latch member on the hitch frame and a handle for pivoting the fourth means to move the front latch members between their positions.

11. The apparatus of claim 10 further characterized in that the second means includes a lock arm movable relative to the hitch frame between a position abutting against one of the front latch members and the handle to block movement of the front latch members from their latching position and a second position permitting movement of the front latch members to their release position.

12. Trailer hitch apparatus adapted for being removably mounted by a towing vehicle having a vehicle bed and a vehicle frame, comprising a mounting member adapted for being fixedly mounted to one of the vehicle frame and the vehicle bed and having a bottom surface, a first transversely extending edge portion and a second transversely extending edge portion, one of the mounting member edge portions being a front edge portion and the other a rear edge portion, a longitudinally elongated hitch frame having longitudinally spaced first and second end portions, first means fixed to the hitch frame adjacent to the hitch frame first end portion and extending a substantial distance beneath the hitch frame for engaging the mounting member first edge portion including the bottom surface to block movement of the hitch frame in a vertical direction and one of a forward and a rearward direction, second means pivotally mounted to the hitch frame adjacent to the hitch frame second end portion for movement between a first position for engaging the mounting member second edge portion, including the mounting member bottom surface when the first means engages the mounting member first end portion including the mounting member bottom surface to block movement of the hitch frame in a vertical direction and the other of said forward and rearward direction, and a release second position permitting the hitch frame first being moved in said other of the forward and rearward directions and thence vertically away from the mounting member, handle means joined to the second means for selectively moving the second means between the second means positions, and lock means pivotally mounted on the hitch frame for being manually moved between a first position abutting against the second means in its first position for locking the second means in the second means first position and a second position permitting the handle means moving the second means to the release position, the second means in its first position extending below the hitch frame.

13. The apparatus of claim 12 further characterized in that the first means comprises transvesely spaced first and second latch arms fixedly attached to the hitch frame and that the second means includes transversely spaced third and fourth latch legs having first end portions and a latch leg pivot for mounting the third and fourth first end portions, and that the handle is joined to at least one of the pivot and the legs for moving the third and fourth legs when the handle is moved.

14. The apparatus of claim 13 further characterized in that the lock means includes a lock arm movable between the lock means positions and means for constantly resiliently urging the lock arm in the direction toward the lock means first position to the lock means first position.

15. The apparatus of claim 14 further characterized in that the first and second latch legs are rear latch legs, that the hitch frame first end portion is a hitch frame rear end portion, that the mounting member first end portion is the mounting member rear end portion, that the mounting member includes a mounting plate adapted for being bolted to the vehicle frame beneath the bed, a rear edge portion and a front end portion and a rear stud fixed to the mounting plate rear edge portion that is engagable by the first latch leg and a front stud fixed to the mounting plate front edge that is engagable by the third latch leg, the bed having a latch slot for each latch leg that opens to the mounting member to have the respective latch leg extended therethrough for engaging the respective mounting member edge portion that at least in part is defined by the studs.

* * * * *